(12) United States Patent
Pandey et al.

(10) Patent No.: US 8,348,280 B2
(45) Date of Patent: Jan. 8, 2013

(54) SEAL APPARATUS

(75) Inventors: Vishwas Kumar Pandey, Karnataka (IN); Upendra Prabhu Nath Vemula Gopinath, Karnataka (IN); Bhaskar Mani, Karnataka (IN); Donkada Santhosh, Karnataka (IN)

(73) Assignee: General Electric Company, Schenectady, NY (US)

( * ) Notice: Subject to any disclaimer, the term of this patent is extended or adjusted under 35 U.S.C. 154(b) by 139 days.

(21) Appl. No.: 12/910,323

(22) Filed: Oct. 22, 2010

(65) Prior Publication Data

US 2012/0098211 A1    Apr. 26, 2012

(51) Int. Cl.
*F16J 15/447* (2006.01)

(52) U.S. Cl. .......... 277/416; 277/93; 277/493; 277/496; 277/546

(58) Field of Classification Search .................. 277/416, 277/493, 496, 497, 543, 631, 546, 632
See application file for complete search history.

(56) References Cited

U.S. PATENT DOCUMENTS

| | | | | |
|---|---|---|---|---|
| 721,710 A * | 3/1903 | Lewis et al. | ..................... | 277/515 |
| 733,588 A * | 7/1903 | Janda | ............................ | 277/546 |
| 975,313 A * | 11/1910 | Badeker | ........................ | 277/510 |
| 1,589,482 A * | 6/1926 | Penberthy | ...................... | 277/498 |
| 1,842,910 A * | 1/1932 | Lister | .............................. | 92/189 |
| 2,485,862 A * | 10/1949 | Caza | ............................... | 277/496 |
| 2,846,281 A * | 8/1958 | Szigeti | .......................... | 277/493 |
| 3,235,275 A * | 2/1966 | Hart | ................................ | 277/546 |
| 5,149,108 A * | 9/1992 | Leiszter | ......................... | 277/632 |
| 5,149,109 A * | 9/1992 | Jelinek et al. | .................. | 277/632 |
| 5,201,530 A | 4/1993 | Kelch et al. | | |
| 6,030,175 A * | 2/2000 | Bagepalli et al. | ........... | 415/173.3 |
| 6,431,550 B1 * | 8/2002 | Tong | ............................... | 277/346 |
| 6,502,823 B1 * | 1/2003 | Turnquist et al. | ............ | 277/355 |
| 6,588,764 B2 * | 7/2003 | Fuller | ............................ | 277/547 |
| 7,097,423 B2 | 8/2006 | Burdgick | | |
| 7,341,256 B2 * | 3/2008 | Nakaoka et al. | ............... | 277/496 |
| 7,631,879 B2 | 12/2009 | Diantonio | | |
| 7,717,433 B2 * | 5/2010 | Taylor et al. | ................... | 277/416 |
| 7,766,339 B2 * | 8/2010 | Umetsu et al. | ................. | 277/496 |
| 8,061,716 B2 * | 11/2011 | Wirt | ............................... | 277/631 |
| 8,162,325 B2 * | 4/2012 | Lindner-Silwester et al. | ............................ | 277/546 |
| 2004/0013522 A1 | 1/2004 | Burdgick | | |
| 2004/0017050 A1 | 1/2004 | Burdgick | | |
| 2004/0022626 A1 | 2/2004 | Burdgick | | |
| 2004/0239051 A1 | 12/2004 | Burdgick | | |
| 2009/0051126 A1 * | 2/2009 | King et al. | ..................... | 277/631 |

* cited by examiner

*Primary Examiner* — Vishal Patel
*Assistant Examiner* — Eugene G Byrd
(74) *Attorney, Agent, or Firm* — Cantor Colburn LLP

(57) ABSTRACT

A seal apparatus including at least first and second adjacent seal segments, each including an elongate body with ends defined at opposing elongate body ends, to be arranged such that an end of the first seal segment joins with a complementary end of the second seal segment, the end of the first seal segment including a first male component protruding from a plane of a first seal surface to define a first female mating section about the first male component, the end of the second seal segment including a second male component protruding from a plane of a second seal surface to define a second female mating section about the second male component, the first and second male components being receivable in the second and first female mating sections, respectively, to form first and second male component overlaps in at least two dimensions.

17 Claims, 3 Drawing Sheets

SEAL APPARATUS

BACKGROUND OF THE INVENTION

The subject matter disclosed herein relates to a seal apparatus and, more particularly, to a seal apparatus to restrict leakage flow.

In a turbine engine, such as a steam turbine engine, high energy fluids, such as steam, are directed through a turbine section where they aerodynamically interact with turbine buckets to cause turbine bucket rotation by which power and/or electricity may be generated. Thus, since the turbine bucket rotation is caused by the interaction of the high energy fluids and the turbine buckets, any leakage of the high energy fluids represents an efficiency cost in the power and/or electricity generation.

In some case, leakage of high energy fluids occurs through leakage flow paths defined between stationary components of the turbine engine. Zero clearance seals are, therefore, typically installed within these leakage flow paths to prevent or at least substantially restrict the high energy fluid leakage. Zero clearance seals are employed because they are formed to provide zero or nearly zero clearance between themselves and the stationary parts. In practice, however, even zero clearance seals may allow for the leakage of high energy fluids to occur due to errors associated with machining tolerances or thermal expansion of the seals.

Where zero clearance seals allow for the leakage of high energy fluids to occur, the leakage may be directed in either the axial dimension (i.e., along a longitudinal length of the turbine), the radial dimension (i.e., radially outwardly from the turbine) or both the axial and radial directions.

BRIEF DESCRIPTION OF THE INVENTION

According to one aspect of the invention, a seal apparatus is provided and includes at least first and second adjacent seal segments, each including an elongate body with ends defined at opposing elongate body ends, to be arranged such that an end of the first seal segment joins with a complementary end of the second seal segment, the end of the first seal segment including a first male component protruding from a plane of a first seal surface to define a first female mating section about the first male component, the end of the second seal segment including a second male component protruding from a plane of a second seal surface to define a second female mating section about the second male component, the first and second male components being receivable in the second and first female mating sections, respectively, to form first and second male component overlaps in at least two dimensions.

According to another aspect of the invention, a seal apparatus is provided and includes four or more seal segments, each including an elongate body with ends defined at opposing elongate body ends, to be arranged in an end to end configuration to form an annular seal with an end of each seal segment joining with a complementary end of an adjacent seal segment, opposing ends of each seal segment including first and second male components protruding from planes of first and second seal surfaces, respectively, to define first and second female mating sections about the first and second male components, respectively, the first and second male components of adjacent seal segments being receivable in the second and first female mating sections, respectively, of the adjacent seal segments to form first and second male component overlaps in at least axial and radial dimensions defined relative to axial and radial dimensions of the annular seal.

According to yet another aspect of the invention, a turbine engine is provided and includes stationary components formed to define a leakage flow path therebetween and an annular seal disposed between the stationary components to restrict leakage along the leakage flow path in axial and radial dimensions, the annular seal including at least first and second adjacent seal segments, each including an elongate body with ends defined at opposing elongate body ends, to be arranged such that an end of the first seal segment joins with a complementary end of the second seal segment, the end of the first seal segment including a first male component protruding from a plane of a first seal surface to define a first female mating section about the first male component, the end of the second seal segment including a second male component protruding from a plane of a second seal surface to define a second female mating section about the second male component, the first and second male components being receivable in the second and first female mating sections, respectively, to form first and second male component overlaps in at least the axial and radial dimensions.

These and other advantages and features will become more apparent from the following description taken in conjunction with the drawings.

BRIEF DESCRIPTION OF THE DRAWING

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

Figure 1:
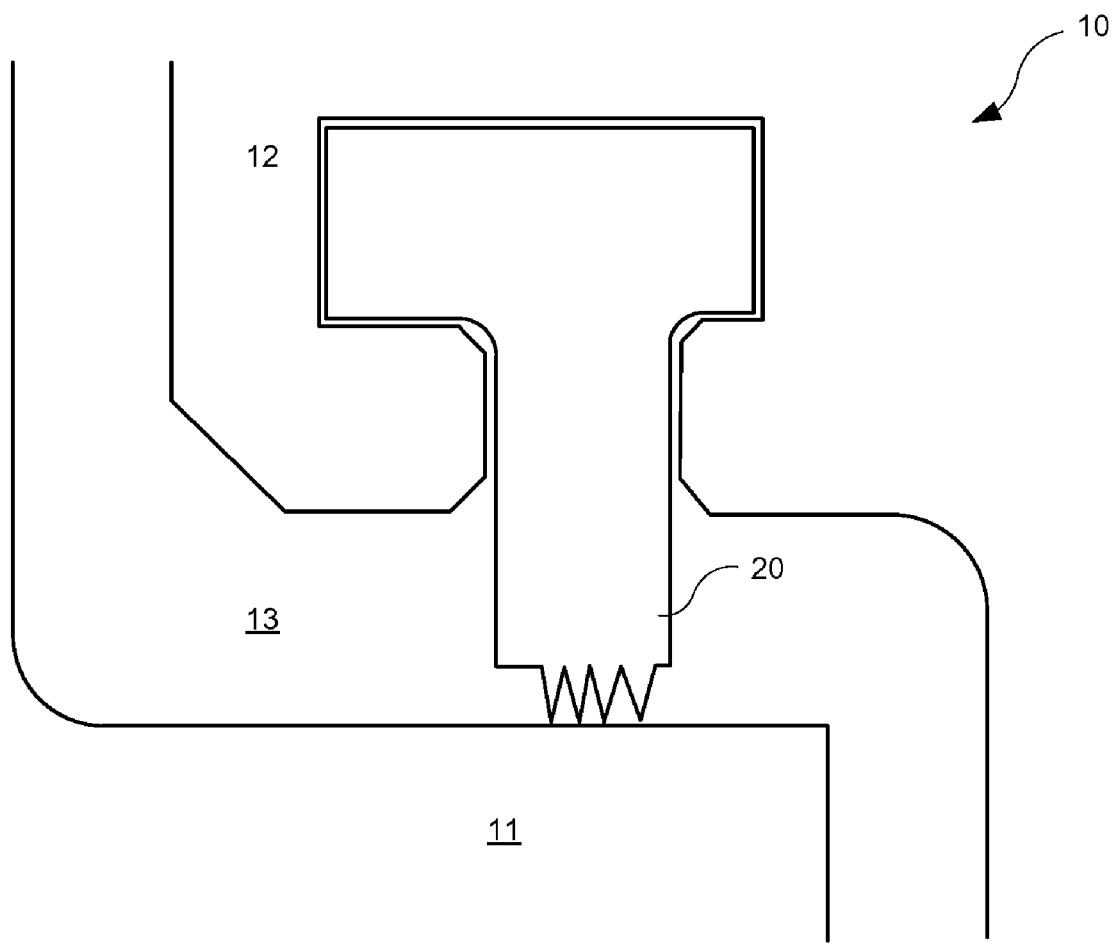
FIG. 1 is a side view of a seal disposed between stationary parts in a turbine engine.
Figure 2:
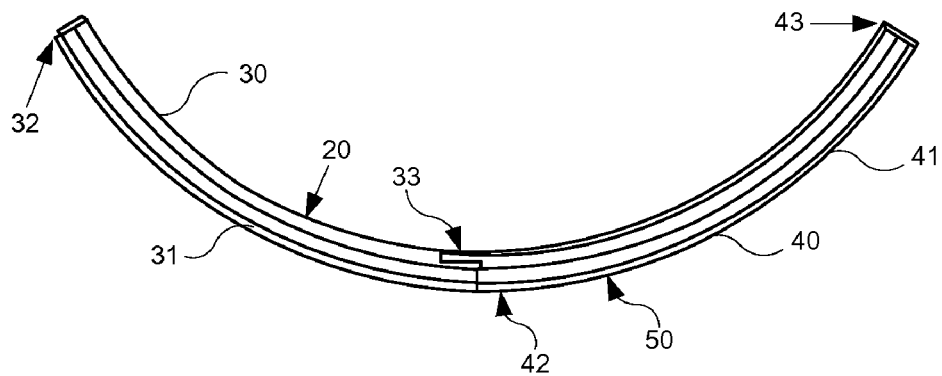
FIG. 2 is an axial view of the seal of FIG. 1.

The detailed description explains embodiments of the invention, together with advantages and features, by way of example with reference to the drawings.

DETAILED DESCRIPTION OF THE INVENTION

With reference to FIGS. 1-4, a turbine engine 10, such as a steam turbine engine or a gas turbine engine, is provided. The turbine engine 10 includes a first stationary component 11, such as a packing head, and a second stationary component 12, such as a diaphragm. The first and second stationary components 11 and 12 are disposed relative to one another to form a leakage flow path 13. High energy fluids, such as steam in the case of the steam turbine engine, leak from a main flow path and flow along the leakage flow path 13. The turbine engine 10 further includes a seal apparatus 20 to restrict the flow of the high energy fluids along the leakage flow path 13 in at least two dimensions.

The seal apparatus 20 includes at least first and second adjacent seal segments 30 and 40. Each of the first and second seal segments 30 and 40 includes an elongate body 31 and 41 with opposing ends 32, 33 and 42, 43, respectively, defined at opposing elongate body ends. The first and second seal segments 30 and 40 are arranged with respect to one another such that an end (i.e., end 33 of the first seal segment 30) joins with a complementary end (i.e., end 42 of the second seal segment 40). In accordance with embodiments, the seal apparatus 20 may be formed of 4 or more seal segments of similar or varying shape and size with each arranged in an end to end configuration to form an annular shaped seal 50 or a seal with another suitable shape, such as a linear, angular or ovoid shape.

With reference to FIGS. 5-8, the end 33 of the first seal segment 30 includes a first male component 60. The first male component 60 protrudes from a plane of a first seal surface 61 in a substantially normal direction relative to the first seal surface 61 plane to define a first female mating section 62 about the first male component 60. Similarly, the end 42 of the second seal segment 40 includes a second male component 70 protruding from a plane of a second seal surface 71 in a substantially normal direction relative to the second seal surface 71 plane to define a second female mating section 72 about the second male component 70.

Figure 3:
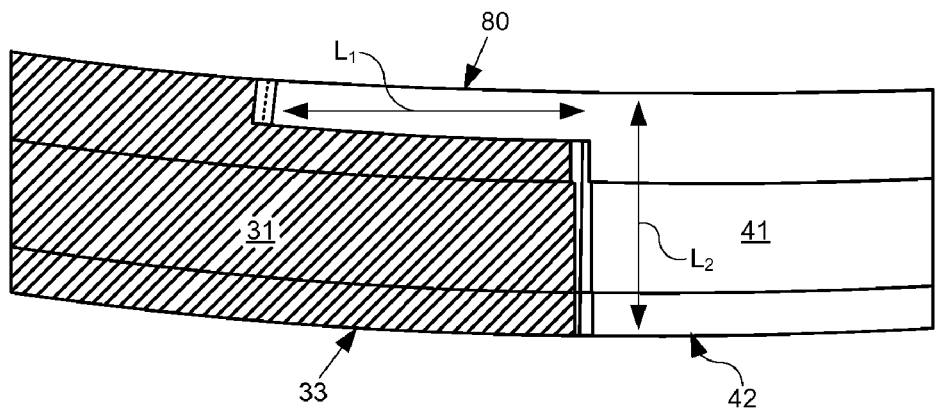
FIG. 3 is an enlarged axial view of the seal of FIG. 1.
Figure 4:
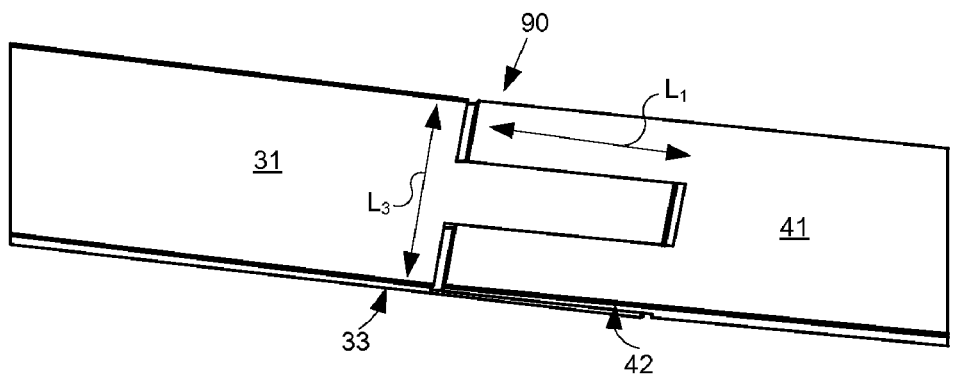
FIG. 4 is an enlarged radial view of the seal of FIG. 1.
Figure 5:
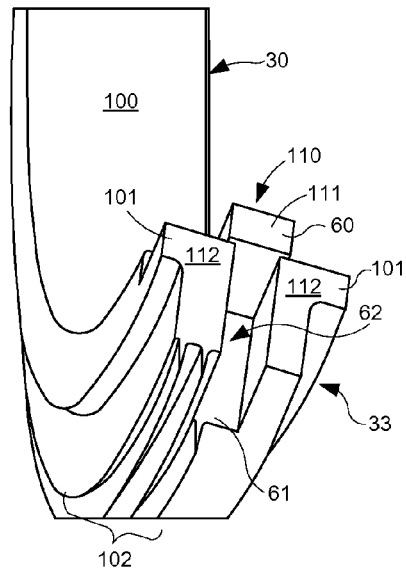
FIGS. 5 and 6 are perspective views of an end of a seal segment in accordance with embodiments.
Figure 6:
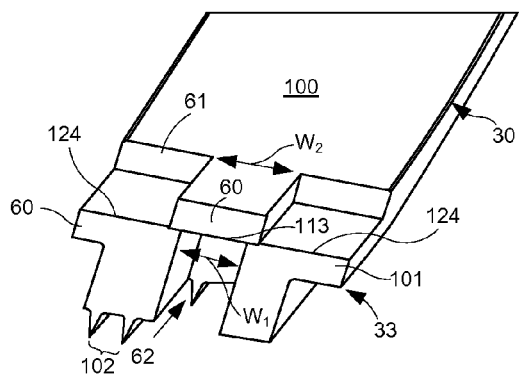
Figure 7:
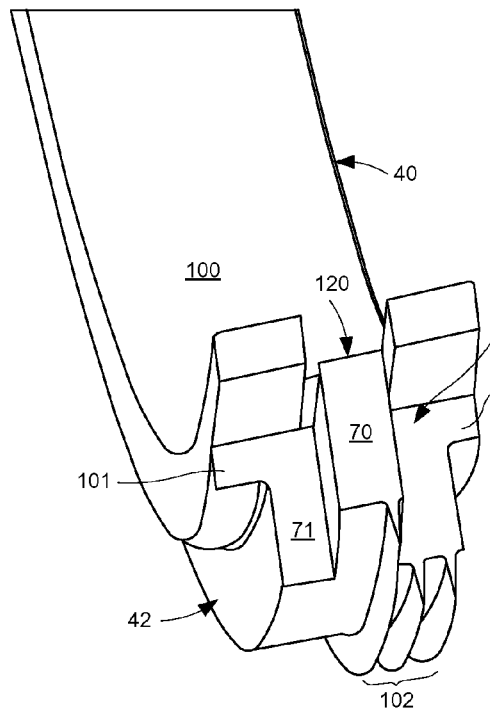
FIGS. 7 and 8 are perspective view of an end of another seal segment that complements the end shown in FIGS. 5 and 6 in accordance with embodiments.
Figure 8:
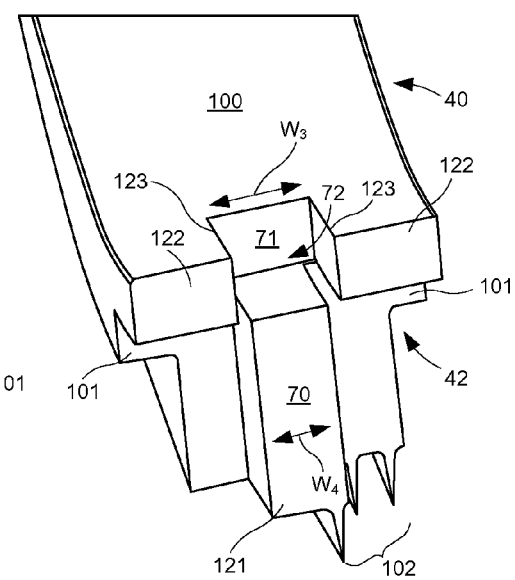

As shown in FIGS. 3 and 4, the first male component 60 is receivable in the second female mating section 72 and the second male component 70 is receivable in the first female mating section 62. In this way, overlap formations are formed of the first male component 60 and the second male component 70 in at least two dimensions defined relative to like dimensions of the annular shaped seal. For example, first overlap formation 80 is formed of the first male component 60 and the second male component 70 in circumferential and radial dimensions, as shown in FIG. 3, and second overlap formation 90 (see FIG. 4) is formed of the first male component 60 and the second male component 70 in circumferential and axial dimensions, as shown in FIG. 4. It is to be understood that the dimensions of the overlap formations may be defined with respect to various reference frames in accordance with a shape of the seal apparatus 20.

The at least first and second seal segments 30 and 40 of the seal apparatus 20 may be formed of metallic and/or metallic alloy materials. The seal segments 30 and 40 are therefore able to respond thermally to increases and decreases in ambient temperatures. That is, for use of the seal apparatus 20 as the annular shaped seal 50, as turbine operations are conducted and the annular shaped seal 50 is heated, the at least first and second seal segments 30 and 40 will thermally expand. In this case, the overlap formations 80 and 90 are configured to have sufficient circumferential, radial and axial lengths $L_1$, $L_2$ and $L_3$ to remain in an overlapping condition.

In accordance with embodiments, a cross section of each of the at least first and second seal segments 30 and 40 may include a hub 100, having a surface to be disposed in contact with one of the stationary components 11 or 12, flanges 101 extending from the hub 100 and seal teeth 102. The seal teeth 102 are configured to be disposed in contact with the other of the stationary components 11 or 12. The flanges 101 and the seal teeth 102 extend away from the hub 100 in transverse directions.

As shown in FIGS. 5-8 and, in accordance with embodiments, the first and second male components 60 and 70 may each include at least a three-prong part 110 and 120, respectively, in complementarily inverted configurations. That is, the three-prong part 110 of the first male component 60 may include a first center prong 111 and first side prongs 112. The first side prongs 112 are separated from one another by a width, $W_1$, which is narrower than a width, $W_2$, of the first center prong 111. The first side prongs 112 are further disposed in seal contact with a surface 113 of the first center prong 111.

In a complementary fashion, the three-prong part 120 of the second male component 70 may include a second center prong 121 and second side prongs 122. The second center prong 121 is receivable between the first side prongs 112 and thereby disposed for seal contact with at least the surface 113 of the first center prong 111 and the first side prongs 112. The second side prongs 122 are separated from one another by a width, $W_3$, which is greater than a width, $W_4$, of the second center prong 121. As such, the second side prongs 122 define a space in which the first center prong 111 is receivable and disposed for seal contact with respective surfaces 123 of the second side prongs 122. Moreover, the second side prongs 122 are receivable above the first side prongs 112 and to the sides of the first center prong 111 to be disposed in contact with at least the respective surfaces 124 of the first side prongs 112.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. A seal apparatus, comprising:

at least first and second adjacent seal segments, each including an elongate body with ends defined at opposing elongate body ends, to be arranged such that an end of the first seal segment joins with a complementary end of the second seal segment, the end of the first seal segment including a first male component protruding from a plane of a first seal surface to define a first female mating section about the first male component, the end of the second seal segment including a second male component protruding from a plane of a second seal surface to define a second female mating section about the second male component, the first and second male components being receivable in the second and first female mating sections, respectively, to form first and second male component overlaps in at least two dimensions and each comprising a three-prong part in complementarily inverted configurations, the first male component three-prong part comprising a first center prong and first side prongs separated by a width narrower than a first center prong width and disposed in contact with a first center prong surface, and the second male component three-prong part comprising a second center prong receivable between the first side prongs for contact with the first center prong surface and second side prongs separated by a width greater than a second center prong width to define a space to receive the first center prong for contact with respective surfaces of the second side prongs.

2. The seal apparatus according to claim 1, wherein the at least first and second seal segments are arranged to form an annular seal for disposition between stationary components of a turbine.

3. The seal apparatus according to claim 2, wherein the turbine comprises a steam turbine and the annular seal restricts steam leakage flow.

4. The seal apparatus according to claim 2, wherein the stationary components comprise any two stationary components.

5. The seal apparatus according to claim 2, wherein the at least first and second seal segments comprise 4 or more seal segments.

6. The seal apparatus according to claim 1, wherein the at least first and second seal segments are formed of metallic or metallic alloy materials.

7. The seal apparatus according to claim 1, wherein the first and second male component overlaps each have sufficient length to remain during thermal expansion of the at least first and second seal segments.

8. The seal apparatus according to claim 1, wherein a cross section of each of the at least first and second seal segments comprises a hub, flanges extending from the hub in one of the at least two dimensions and seal teeth extending from the hub in the other of the at least two dimensions.

9. The seal apparatus according to claim 1, wherein the three-prong part of at least one of the first and second male components includes a seal.

10. The seal apparatus according to claim 1, wherein the three-prong part of at least one of the first and second male components comprises a prong that seals with another prong in at least one of the at least two directions.

11. The seal apparatus according to claim 1, wherein the first and second male components each comprises at least a three-prong part.

12. A seal apparatus, comprising:
four or more seal segments, each including an elongate body with ends defined at opposing elongate body ends, to be arranged in an end to end configuration to form an annular seal with an end of each seal segment joining with a complementary end of an adjacent seal segment,
opposing ends of each seal segment including first and second male components protruding from planes of first and second seal surfaces, respectively, to define first and second female mating sections about the first and second male components, respectively,
the first and second male components of adjacent seal segments being receivable in the second and first female mating sections, respectively, of the adjacent seal segments to form first and second male component overlaps in at least axial and radial dimensions defined relative to axial and radial dimensions of the annular seal and each comprising a three-prong part in complementarily inverted configurations,
the first male component three-prong part comprising a first center prong and first side prongs separated by a width narrower than a first center prong width and disposed in contact with a first center prong surface, and
the second male component three-prong part comprising a second center prong receivable between the first side prongs for contact with the first center prong surface and second side prongs separated by a width greater than a second center prong width to define a space to receive the first center prong for contact with respective surfaces of the second side prongs.

13. The seal apparatus according to claim 12, wherein the axial and radial first and second male component overlaps have sufficient length to remain during thermal expansion of the seal segments.

14. The seal apparatus according to claim 12, wherein the first and second male components each comprises at least a three-prong part in complementarily inverted respective configurations.

15. The seal apparatus according to claim 14, wherein the three-prong part of at least one of the first and second male components includes a seal.

16. A turbine engine, comprising:
stationary components formed to define a leakage flow path therebetween; and
an annular seal disposed between the stationary components to restrict leakage along the leakage flow path in axial and radial dimensions, the annular seal including:
at least first and second adjacent seal segments, each including an elongate body with ends defined at opposing elongate body ends, to be arranged such that an end of the first seal segment joins with a complementary end of the second seal segment,
the end of the first seal segment including a first male component protruding from a plane of a first seal surface to define a first female mating section about the first male component,
the end of the second seal segment including a second male component protruding from a plane of a second seal surface to define a second female mating section about the second male component,
the first and second male components being receivable in the second and first female mating sections, respectively, to form first and second male component overlaps in at least the axial and radial dimensions and each comprising a three-prong part in complementarily inverted configurations,
the first male component three-prong part comprising a first center prong and first side prongs separated by a width narrower than a first center prong width and disposed in contact with a first center prong surface, and the second male component three-prong part comprising a second center prong receivable between the first side prongs for contact with the first center prong surface and second side prongs separated by a width greater than a second center prong width to define a space to receive the first center prong for contact with respective surfaces of the second side prongs, and
the first and second female mating sections being configured to share a common plane with the center prongs of the three-prong parts of the second and first male components, respectively.

17. The turbine engine according to claim 16, wherein the axial and radial first and second male component overlaps have sufficient length to remain during thermal expansion of the at least first and second seal segments.

* * * * *